3,582,311
Patented June 1, 1971

---

3,582,311
**METHOD FOR PRODUCING AQUEOUS
SUSPENSION FERTILIZERS**
Lawrence E. Browder, Colonial Heights, and Harry E.
Ulmer, Hopewell, Va., assignors to Allied Chemical
Corporation, New York, N.Y.
No Drawing. Filed Feb. 16, 1968, Ser. No. 705,929
Int. Cl. C05b 7/00
U.S. Cl. 71—1                                    1 Claim

ABSTRACT OF THE DISCLOSURE

Aqueous suspension fertilizers resistant to sedimentation and formation of large crystals and solid aggregates are formulated to comprise a water-soluble polyphosphate and a water-soluble magnesium compound. The ratio of the weight of the polyphosphate (expressed as $P_2O_5$) to the weight of the magnesium compound (expressed as MgO) is between about 0.2 and about 2, and the sum of the weight of the polyphosphate (expressed as $P_2O_5$) and the weight of the magnesium compound (expressed as MgO) constitutes between about 0.5% and about 12% of the total weight of the fertilizer composition.

---

This invention relates to soil fertilizers in fluid suspension form. More particularly, it relates to the incorporation of water-soluble polyphosphates and water-soluble magnesium compounds into aqueous suspension fertilizers to inhibit the formation of large crystals and the settling of solids therein.

Fluid suspension fertilizers are generally aqueous suspensions of plant-nourishing compounds of phosphorus, nitrogen, and potassium. In general, aqueous suspension fertilizers can contain one, two, or all three of the above kinds of plant nutrients as well as minor amounts of other beneficial additives.

The production and use of aqueous suspension fertilizers is becoming an increasingly attractive alternative to dry fertilizer compositions. Suspension fertilizers have several advantages over dry fertilizers. For example, aqueous suspension fertilizers can be readily formulated to contain up to about 75 percent by weight plant food without sacrificing the operational advantages of simple liquids. A further advantage of suspension fertilizers is the relative ease by which the compositions thereof can be varied.

However, fluid suspension fertilizers have heretofore suffered the disadvantage of being relatively unstable. That is, they tended to undergo rapid fall-out or settling of solid constituents (hereinafter referred to as "sedimentation") and formation of large crystals and solid aggregates. Such properties, impair, inter alia, the flow rates and viscosity values of the fertilizer suspensions. It is known to inhibit such sedimentation and formation of large crystals and solid aggregates by preparing fluid suspension fertilizers in the presence of substantial amounts of clay-like suspension stabilizers. Unfortunately, such prior art suspension stabilizers are only effective for short periods of time; suspension fertilizers containing such stabilizers are generally unfit for use if allowed to stand undisturbed for more than a few hours. Furthermore, clays are not soil fertilizers, and the incorporation of substantial amounts thereof into fluid suspension fertilizers causes dilution and diminished efficacy of the suspension.

Therefore, it is an object of the present invention to provide an aqueous suspension of soil fertilizers which is resistant to sedimentation.

Another object of the invention is to provide an aqueous suspension of soil fertilizers which is resistant to the formation of large crystals and solid aggregates therein.

Another object of the invention is to provide a method for producing an aqueous suspension of soil fertilizers which is resistant to sedimentation.

Yet another object of the invention is to provide a method for producing an aqueous suspension of soil fertilizers which is resistant to the formation of large crystals and solid aggregates therein.

These and other objects as well as a fuller understanding of the present invention can be had by reference to the following detailed description and claim.

According to the present invention, sedimentation and formation of large crystals and solid aggregates in an aqueous suspension of conventional soil fertilizers (e.g., plant-nourishing compounds of nitrogen, phosphorus, and potassium) are effectively inhibited by incorporating into the suspension a water-soluble polyphosphate and a water-soluble magnesium compound in amounts such that the ratio of the weight of the polyphosphate (expressed as $P_2O_5$) to the weight of the magnesium compound (expressed as MgO) is between about 0.1 and about 5.0, and preferably between about 0.2 and about 2.0. Also, the amounts of polyphosphate and magnesium compound used are such that the sum of the weight of the polyphosphate (expressed as $P_2O_5$) and the weight of the magnesium compound (expressed as MgO) constitutes between about 0.5% and about 12% of the weight of the aqueous fertilizer composition, and preferably between about 2% and about 10% thereof.

An especially preferred aqueous suspension fertilizer according to the present invention has a weight ratio of polyphosphate ($P_2O_5$) to magnesium compound (MgO) of between about 0.5 and about 1.0. The sum of the weight of the polyphosphate ($P_2O_5$) and weight of the magnesium compound (MgO) in such especially preferred composition constitutes between about 4% and about 9% of the weight of the total composition.

Water-soluble polyphosphates and magnesium compounds suitable for use in the present invention are aphytotoxic, i.e., they are not harmful to plants. Preferably, such compounds are plant-nourishing.

Preferred polyphosphates suitable for use in this invention are the ammoniated polyphosphoric acids, which are preferably (but not necessarily) employed in commercially available form, e.g., "Poly-N," which is a mixture of 60% ammoniated polyphosphoric acid and 40% ammonium orthophosphates, both percentages being expressed in terms of $P_2O_5$ weight content. It is a feature of this invention that the polyphosphate content of the novel suspension fertilizers is exclusive of other phosphorus compounds, e.g., phosphate salts and the like, which can also be present.

Magnesium compounds suitable for use in the present invention are preferably water-soluble magnesium salts. Magnesium salts which are especially preferred for use in the present invention are the following:

magnesium chlorides, e.g., $MgCl_2$; $MgCl_2 \cdot 6H_2O$
(bischofite)
magnesium nitrates, e.g., $Mg(NO_3)_2$; $Mg(NO_3)_2 \cdot 2H_2O$;
$Mg(NO_3)_2 \cdot 6H_2O$
magnesium sulfates, e.g., $MgSO_4$; $MgSO_4 \cdot H_2O$
(kieserite); $MgSO_4 \cdot 7H_2O$ (epsom salt)
potassium magnesium sulfates, e.g., $K_2Mg(SO_4)_2$ (sulfate of potash-magnesia); $K_2Mg_2(SO_4)_3$ (langbeinite)

Of the water-soluble magnesium compounds suitable for use in the present invention, those which dissolve readily in water (e.g., epsom salt, magnesium nitrates, magnesium chlorides) can be employed in any convenient particle size. However, magnesium compounds which dissolve more slowly in water (e.g., magnesium sulfate, kieserite, potassium magnesium disulfate, langbeinite) are preferably employed in finely divided form such that at least about 80% of their particles are smaller than about 25 mesh (U.S. Sieve Series—A.S.T.M.-E-11-61).

Minor amounts of finely divided clay-like suspension promoters (e.g. attapulgite clay, bentonite) can be advantageously employed conjointly with the use of a polyphosphate and magnesium compound. However, the presence of minor amounts of such clays in the suspension fertilizers of this invention, albeit desirable, is by no means essential. When it is desired to include the use of clay-like suspension promoters in formulating the aqueous suspension fertilizers of the present invention, it is preferred that such clay-like materials be used in amounts of between about 0.5% by weight and about 2% by weight of the total composition. Additional substances, which are beneficial to plants and whose use is conventional in the fertilization arts, may be incorporated into the novel suspension fertilizers of the present invention. Such substances include, for example, compounds of manganese, copper, iron, boron, and the like. The use of such additives, while advantageous, is nevertheless regarded as an ancillary feature of the present invention.

In preparing the novel suspension fertilizers of the present invention, the order of mixing the ingredients is not critical; the advantages of the present invention are realized using any mixing procedure which achieves a uniform suspension. However, for manipulative convenience, it is preferred to combine the constituents in the following order: water, nitrogen-containing compounds, and polyphosphate. If it is desired to include clay-like suspension promoters, it is preferably done at this stage. When such clays are employed, high-shear mixing is required because clays are not effective as suspending agents until the particles thereof are broken down. After the above-mentioned components are blended, a water-soluble magnesium compound (finely comminuted in the case of the slowly soluble varieties) is added and blended into the mixture. Finally, potassium salts and other conventional plant nutrients and the like which are desired to be suspended are added to the system. Alternatively, the potassium salts and other materials to be suspended can be added prior to addition of the magnesium compound. The aqueous suspension fertilizers of the present invention can be readily formulated at ambient temperature or slightly therebelow with conventional agitation (high-shear blending in those instances where suspension-promoting clays are employed). Ambient temperatures are herein defined to mean temperatures substantially below the boiling point of water, and preferably between about 5° C. and about 75° C.

The novel aqueous suspension fertilizers of the present invention are two-phase (solid-liquid) compositions which can be produced and stored for at least about 24 hours without any significant sedimentation or growth of large crystals and solid aggregates (i.e., crystals and aggregates large enough to cause clogging of pipelines and spraying equipment). This period of stability enjoyed by the fluid suspension fertilizers of the present invention permits the utilization thereof without the need for agitation and redispersion of the suspended particles between the time the suspensions are formulated and the time of their application to the soil. Without wishing to be bound by theory, it is believed that the advantages of the present invention are achieved by virtue of interaction between the polyphosphate and magnesium compound. These substances, when present in an aqueous fertilizer suspension in amounts such that the weight ratio of polyphosphate ($P_2O_5$) to magnesium compound (MgO) is about 0.1–5.0 and their total concentration is such that they constitute about 0.5–12% of the weight of the suspension, combine to produce magnesium polyphosphates in the form of needle-shaped crystals which act as a random lattice or matrix within the fluid suspension fertilizer, somewhat analogous to a haystack. This lattice entraps the suspended particles and retards the rate of fall-out thereof, and also promotes the formation of small crystals and aggregates (i.e., crystals and aggregates which are small enough to avoid clogging of pipelines and spraying equipment).

In the following examples, parts and percentages are by weight unless otherwise indicated.

For convenience in formulating the suspension fertilizers described in the examples, the fertilizer nitrogen is derived from "Uran-30" and "Uran-32" which are aqueous solutions of urea and ammonium nitrate made up to give total nitrogen concentrations of 30% by weight and 32% by weight, respectively. It is not intended, however, to limit the source of nitrogen to those materials.

The compositions of the fluid suspension fertilizers are expressed in terms of "composition ratios," wherein the relative amounts by weight of nitrogen, phosphorus, potassium, and magnesium are expressed as integers. The suspensions are analysed by conventional procedures: nitrogen content is expressed in terms of elemental nitrogen; phosphorus content (60 percent of which is polyphosphate) is expressed in terms of phosphorus pentoxide; potassium content is expressed in terms of potassium oxide; and magnesium content is expressed in terms of magnesium oxide.

The stability of the fluid suspension fertilizers prepared in the examples is measured by filling a graduated cylinder to a known volume with suspension and allowing the cylinder to stand undisturbed for 24 hours. At the end of this time, the volume of clear liquid on top of the suspension is determined and subtracted from the total volume of the suspension to give the volume of suspended solids. The volume of suspended solids divided by the total volume multiplied by 100 gives the percent apparent solids. The relation between the quality (i.e., stability) of a given fluid suspension fertilizer of the present invention and the percent apparent solids is as follows.

Percent:
| | |
|---|---|
| 100 | Excellent. |
| 95–99 | Very good. |
| 90–94 | Good. |
| Less than 90 | Unsatisfactory. |

EXAMPLE 1

A fluid suspension fertilizer according to the present invention is prepared having the following composition ratio: 10(N)-2($P_2O_5$)-10($K_2O$)-5(MgO). The sum of the weight of the polyphosphate (expressed as $P_2O_5$) and the weight of the magnesium compound (expressed as MgO) constitutes 6.3% of the total composition.

To a conventionally stirred mixture of 32.8 parts of water, 58.8 parts of Uran 32% nitrogen solution, 31.8 parts of potassium chloride, and 61.4 parts of epsom salt is added 11.8 parts of Poly-N (10% N; 34% $P_2O_5$). A fluid suspension is readily formed which has a stability rating of "very good." The suspension can be applied to the soil without difficulty using conventional liquid fertilizer dispensing equipment.

EXAMPLE 2

A fluid suspension fertilizer according to the present invention is prepared having the following composition ratio: 18(N)-2($P_2O_5$)-9($K_2O$)-3(MgO). The sum of the weight of the polyphosphate (expressed as $P_2O_5$) and the weight of the magnesium compound (expressed as MgO) constitutes 4.0% of the total composition.

To a stirred mixture of 18.4 parts of water and 104.4 parts of Uran 32% nitrogen solution are added 28.6 parts of potassium chloride and 36.8 parts of epsom salt. Then 11.8 parts of Poly-N (10% N; 34% $P_2O_5$) is added to give a readily-formed fluid suspension which has a stability rating of "excellent." The suspension can be applied to the soil without difficulty using conventional liquid fertilizer dispensing equipment.

EXAMPLE 3

A fluid suspension fertilizer according to the present invention is prepared having the following composition ratio: 10(N)-2($P_2O_5$)-10($K_2O$)-5(MgO). The sum of the weight of the polyphosphate (expressed as $P_2O_5$) and the weight of the magnesium compound (expressed as MgO) constitutes 6.7% of the total composition.

To a stirred mixture of 1168 parts of water, 1256 parts of Uran 30% nitrogen solution, 646 parts of potassium chloride, and 714 parts of kieserite (having a particle less than 150 mesh) is added 216 parts of Poly-N (11% N; 37% $P_2O_5$). A fluid suspension is obtained which has a stability rating of "very good," and which can be applied to the soil without difficulty using conventional liquid fertilizer dispensing equipment.

EXAMPLE 4

A fluid suspension fertilizer according to the present invention is prepared having the following composition ratio: 14(N)-1($P_2O_5$)-14($K_2O$)-7(MgO). The sum of the weight of the polyphosphate (expressed at $P_2O_5$) and the weight of the magnesium compound (expressed as MgO) constitutes 7.9% of the total composition.

To a stirred mixture of 13.8 parts water, 85.6 parts of Uran 32% nitrogen solution, 45.2 parts of potassium chloride and 50.0 parts of kieserite (having a particle size less than 150 mesh) is added 5.4 parts of Poly-N (11% N; 37% $P_2O_5$). A fluid suspension is readily obtained having a stability rating of "very good," and which can be applied to the soil without difficulty using conventional liquid fertilizer dispensing equipment.

EXAMPLE 5

A fluid suspension fertilizer according to the present invention is prepared having the following composition ratio: 8(N)-4($P_2O_5$) - 8($K_2O$)-0.5(MgO)-0.25(MnO)-0.10(CuO)-0.15($Fe_2O_3$)-0.1($B_2O_3$). The sum of the weight of the polyphosphate (expressed as $P_2O_5$) and the weight of the magnesium compound (expressed as MgO) constitutes 3.0% of the total composition.

To 297 parts of water are added 6 parts of attapulgite clay, 27 parts of sulfate of potash-magnesia (containing 24% $K_2O$ and 10.8% MgO), and the following amounts of secondary and macronutrients: 1.5 parts of manganous oxide, 1.8 parts of copper sulfate, 1.9 parts of ferrous sulfate, and 1.1 parts of boron trioxide. The resulting mixture is blended for 5 minutes at high shear and the following materials are then added: 128 parts of 32% Uran nitrogen solution, 65 parts of potassium chloride, and 71 parts of Poly-N (10% N; 34% $P_2O_5$). After an additional 5 minutes of blending, a fluid suspension is readily obtained having a stability rating of "very good." The suspension can be applied to the soil without difficulty using conventional liquid fertilizer dispensing equipment.

EXAMPLE 6

A fluid suspension fertilizer according to the present invention is prepared having the following composition ratio: 12(N)-3($P_2O_5$)-6($K_2O$)-3(MgO). The sum of the weight of the polyphosphate (expressed as $P_2O_5$) and the weight of the magnesium compound (expressed as MgO) constitutes 4.8% of the total composition.

To a stirred mixture of 172 parts of water, and 208 parts of 32% Uran nitrogen solution is added 167 parts of sulfate of magnesia-potash (containing 24% $K_2O$ and 10.8% MgO). The mixture is stirred for 15 minutes and then 53 parts of Poly-N (10% N; 34% $P_2O_5$) is added. Further stirring for 5 minutes gives a fluid suspension having a stability ratio of "very good" (97%), and which can be applied to soil without difficulty using conventional liquid fertilizer dispensing equipment.

EXAMPLE 7

A fluid suspension fertilizer according to the present invention is prepared having the following composition ratio: 8(N)-2($P_2O_5$)-8($K_2O$)-4(MgO). The sum of the weight of the polyphosphate (expressed as $P_2O_5$) and the weight of the magnesium compound (expresed as MgO) constitutes 5.2% of the total composition.

To a mixture of 134.3 parts of water and 92.7 parts of 32% Uran nitrogen solution is added 4.0 parts of attapulgite clay. After blending at high shear for 5 minutes, 145.5 parts of sulfate of potash-magnesia (containing 24% $K_2O$ and 10.8% MgO) is added to the mixture. After an additional 10 minutes of blending, 23.5 parts of Poly-N (10% N; 34% $P_2O_5$) is added. A fluid suspension is readily obtained having a stability rating of "very good" and which can be applied to the soil without difficulty using conventional liquid fertilizer dispensing equipment.

EXAMPLE 8

A fluid suspension fertilizer according to the present invention is prepared having the following composition ratio: 8.7(N)-4($P_2O_5$)-8($K_2O$)-4(MgO)-1(MnO). The sum of the weight of the polyphosphate (expressed as $P_2O_5$) and the weight of the magnesium compound (expressed as MgO) constitutes 6.4% of the total composition.

To a mixture of 110.2 parts of water, 85.3 parts of Uran 32% nitrogen solution is added 110 parts of manganese sulfate and 145.5 parts of sulfate of potash-magnesia (24% $K_2O$, 10.8% of MgO). After blending at high shear for 10 minutes, there is added 47.0 parts of Poly-N (10% N; 34% $P_2O_5$) to give a fluid suspension having a stability rating of "excellent." The suspension can be applied to the soil without difficulty using conventional liquid fertilizer dispensing equipment.

EXAMPLE 9

A fluid suspension fertilizer according to the present invention is prepared having the following composition ratio: 12(N)-4($P_2O_5$)-8($K_2O$)-2(MgO). The sum of the weight of the polyphosphate (expressed as $P_2O_5$) and the weight of the magnesium compound (expressed as MgO) constitutes 4.4% of the total composition.

To 196 parts of cold water is added 12 parts of attapulgite clay. After 5 minutes of high-shear blending, there is added 203 parts of Uran 32% nitrogen solution, 54 parts of potassium chloride and 64 parts of langbeinite (18.7% MgO) having a particle size of less than 30 mesh. After 5 additional minutes of high-shear blending, 71 parts of Poly-N (10% N; 34% $P_2O_5$) are added to give a fluid supspension having a stability rating of "very good." The suspension can be applied to the soil without difficulty using conventional liquid fertilizer dispensing equipment.

EXAMPLE 10

A fluid suspension fertilizer according to the present invention is prepared having the following composition ratio: 12(N)-12($P_2O_5$)-12($K_2O$)-2(MgO). The sum of the weight of the polyphosphate (expressed as $P_2O_5$) and the weight of the magnesium compound (expressed as MgO) constitutes 9.3% of the total composition.

To a mixture of 40.1 parts of water, 105.9 parts of Uran 32% nitrogen solution, and 141.1 parts of Poly-N (10% N; 34% $P_2O_5$) is added 6.0 parts of attapulgite clay. After 5 minutes of high-shear blending, there are added 44.5 parts of langbeinite (18.7% MgO) and 62.4 parts of potassium chloride (62% $K_2O$). Additional blending for 5 minutes easily affords a fluid suspension having a stability rating of "very good." The suspension can be applied to the soil without difficulty using conventional liquid fertilizer dispensing equipment.

EXAMPLE 11

This example demonstrates the relatively poor stability of a fluid fertilizer suspension prepared without use of the present invention. In particular, a fluid fertilizer suspension is prepared having the following composition ratio: 10(N)-0($P_2O_5$)-10($K_2O$)-5(MgO).

To 323 parts of water is added 30 parts of attapulgite clay. After 5 minutes of blending under conditions of high shear, there are added 313 parts of Uran 32% nitrogen solution, 67 parts of potassium chloride and 267 parts of langbeinite (18.7% MgO) having a particle size of less than 30 mesh. An additional high-shear blending for 5 minutes afforded a fluid suspension which is only stable for about 8 hours before extensive crystal growth is noticed.

EXAMPLE 12

This example, when compared with the results of Example 11 shows the greater stability of fluid suspension fertilizers prepared according to the present invention. In this example, a fluid fertilizer suspension is prepared having the following composition ratio: $10(N)$-$2(P_2O_5)$-$10(K_2O)$-$2(MgO)$. The sum of the weight of the polyphosphate (expressed as $P_2O_5$) and the weight of the magnesium compound (expressed as MgO) constitutes 3.2% of the total composition.

To 239 parts of cold water is added 12 parts of attapulgite clay. After 5 minutes of blending under conditions of high shear, there are added 177 parts of 32% Uran nitrogen solution, 73 parts of potassium chloride (63% $K_2O$), and 64 parts of langbeinite (as used in Example 11). Finally, 35 parts of Poly-N (10% N; 37% $P_2O_5$) are added. An additional 5 minutes of high-shear blending afforded a fluid suspension having a stability rating of "excellent." The suspension can be applied to the soil without difficulty using conventional liquid fertilizer dispensing equipment.

The foregoing examples are provided purely for the purpose of illustrating the novel suspension fertilizers of the present invention and the process for preparing same. It is understood that variations and modifications can be made in the materials and procedures disclosed herein without departing from the spirit and scope of the present invention as defined by the following claim.

What is claimed is:

1. An improved method of producing a stable suspension type fertilizer having high plant food content which comprises admixing water with a plant nutrient selected from the group consisting of nitrogen compounds, phosphorus compounds and potassium compounds; a plant nutrient selected from the group consisting of manganese compounds, copper compounds, iron compounds and boron compounds; a water-soluble polyphosphate selected from the group consisting of ammoniated polyphosphoric acids; and a water-soluble magnesium compound selected from the group consisting of magnesium chlorides, magnesium nitrates, magnesium sulfates, and potassium magnesium sulfates; said magnesium sulfates and potassium magnesium sulfates being further characterized in that at least about 80% of their particles have a sieve size smaller than about 25 U.S. mesh prior to admixing; the ratio of the weight of the polyphosphate to the weight of the magnesium compound being between about 0.5 and about 1.0, and the sum of the weight of the polyphosphate and the weight of the magnesium compound being between about 4% and 9% of the total weight of the composition, said weights of polyphosphate and magnesium compound being expressed in terms of phosphorus pentoxide and magnesium oxide, respectively; whereby there is produced a suspension type fertilizer characterized by remaining in suspension form for at least 24 hours after production.

References Cited

UNITED STATES PATENTS

| | | | |
|---|---|---|---|
| 3,113,858 | 12/1963 | Slack et al. | 71—53 |
| 3,174,844 | 3/1965 | Bridger | 71—1 |
| 3,179,509 | 4/1965 | Schuman | 71—53 |
| 3,326,666 | 6/1967 | Walters, Jr. | 71—33 |
| 3,503,706 | 3/1970 | Legal, Jr. | 71—34 |

REUBEN FRIEDMAN, Primary Examiner

C. N. HART, Assistant Examiner

U.S. Cl. X.R.

71—29, 33, 63, 64